United States Patent Office 2,797,769
Patented July 2, 1957

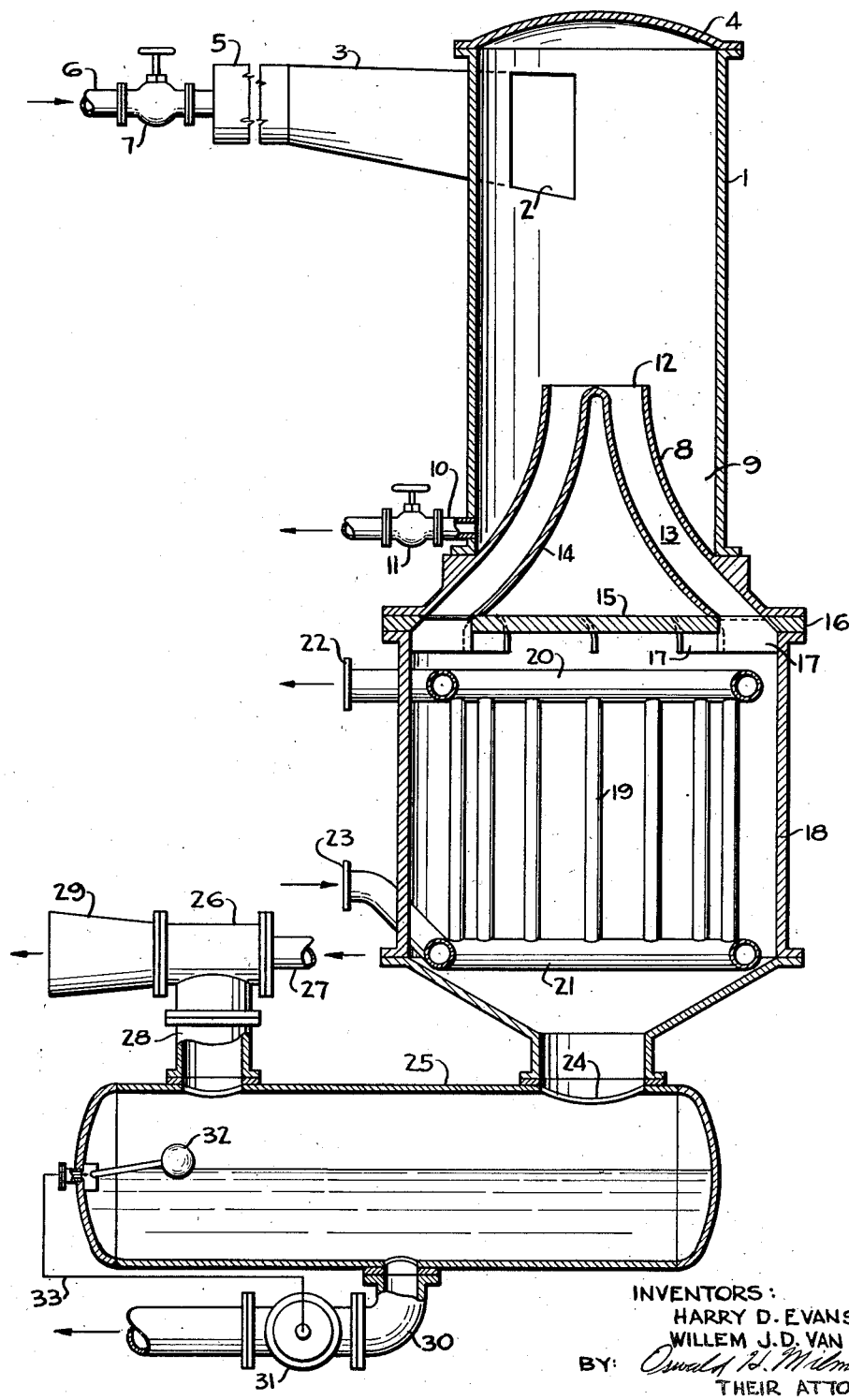

2,797,769

CENTRIFUGAL SEPARATOR

Harry D. Evans, Concord, Calif., and Willem J. D. Van Dijck, The Hague, Netherlands, assignors to Shell Development Company, Emeryville, Calif., a corporation of Delaware Application February 23, 1954, Serial No. 411,948

9 Claims. (Cl. 183—32)

This invention relates to apparatus for separating dispersed foreign material from gases in a centrifugal separator of the non-rotative type, often known as a cyclone; it is particularly although not exclusively applicable to the separation of dispersed liquids from vapor in equilibrium therewith and the immediate condensation of part or all of the residual vapor, e. g., following a flashing operation of a petroleum oil fraction. The term gas, as used herein, includes vapor.

In separators of the type indicated, the gas, burdened with dispersed particles, such as dust or liquid drops, is introduced with a whirling motion into a separating chamber, e. g., through a tangential inlet or through a fan blade at one end of the chamber and flows vertically through the separating chamber with a helical or spiral motion, usually accompanied by the formation of a vortex, i. e., with higher angular velocities near the axis than at the outer wall of the chamber. The dispersed particles, being entrained, also move about the chamber axis. The fundamental action consists of centrifugal settling of the dispersed particles toward the outer wall of the chamber during the vertical movement of the gas and collection of the particles at said wall, while the residual gas is discharged from the chamber through an outlet near the axis. The pressure drop across the separator significantly contributes to power required to effect flow of the gas through the cyclone and operating economies could be achieved were such pressure drop reduced.

A low pressure drop is particularly desirable in the case of cyclones used for separating liquid from vapor in equilibrium therewith, e. g., in a vacuum flashing vaporizing process, wherein petroleum oil that was heated in a furnace is expanded to a low pressure to cause vaporization of a portion thereof, resulting in a dispersion of liquid drops in vapor. In such an operation suction is usually applied to the vapor discharge line from the cyclone by connecting it to a low-pressure zone, e. g., by passing the discharged vapor to a condenser for effecting complete or partial condensation and/or a jet eductor. It is evident that the pressure at which the oil is vaporized will exceed the pressure of the low-pressure zone by the amount of the pressure drop. Further, the pressure in the cyclone, at which the liquid is separated from the vapor, is usually considerably in excess of the pressure prevailing in the condenser. More effective separation occurs and more desirable equilibrium conditions often prevail at low cyclone pressures than at high cyclone pressures.

It is an object to provide an improved apparatus for centrifugal separation of dispersed material from gas wherein the pressure drop through the separator is reduced by recovering pressure in the effluent gas.

A further object is to provide an improved apparatus for centrifugally separating dispersed liquid from a vapor in equilibrium therewith and immediately condensing residual vapor wherein recovery of pressure is effected by an improved flow of the effluent vapor stream to the condenser.

In summary, according to the invention, the separator includes a centrifugal vortex chamber having an inlet near the top directed to admit the gas, burdened with dispersed material, with a rotary or vortical motion, an annular collecting trough within the chamber and below said inlet for said material, and a vapor- or gas-downcomer extending through said collecting trough for residual gas, whereby all fluids traverse the separator with a downward motion. For recovering pressure the downcomer is downwardly divergent and substantially unobstructed so as to permit unimpeded flow of gas with a motion about the cyclone axis; the downcomer is preferably provided with a central deflector, such as a cone, or other wall structure that gives the downcomer passageway an annular form and prevents or reduces vertical or toroidal eddies within the downcomer. As applied to the separation of liquid from vapor, the downcomer is in direct communication with the top of a condenser that is situated beneath the separator and the downcomer, whereby the wider end of the downcomer debouches directly to the low-pressure zone without the interposition of pipes, bends, or the like. Straightening vanes may, however, be optionally interposed.

The invention will be described in detail with reference to the accompanying drawing forming a part of this specification, the single figure of which is a vertical sectional view of one embodiment of the separator-condenser combination according to the invention, this embodiment being merely illustrative and parts thereof being shown diagrammatically.

Referring to the drawing in detail, the number 1 designates a stationary vertical shell defining a centrifugal separating zone and formed as a surface of revolution to constitute a vortex chamber which may, for example, be cylindrical, as shown. The shell has, near the top, an inlet of any suitable design that will admit fluid with a motion of rotation about the shell axis, such as an opening 2 in the shell wall and an approach duct 3 disposed substantially tangentially to the shell; the top is closed by a closure 4. Other inlet arrangements, such as a volute inlet or an inlet through the top may be employed; being in themselves known in the art, no further description thereof is presented herein. The approach duct 3 may be supplied with a dispersion through a transfer duct 5 to the inlet end of which is connected a pipe 6 and an expansion device including a control valve 7. The pipe 6 may, for example, admit oil that has been heated in a furnace and is entirely or partially in the liquid state at a pressure in excess of that in the transfer duct, whereby the oil is subjected to a rapid decrease in pressure upon entering the transfer duct, resulting in partial vaporization or flashing and the formation of a dispersion of liquid droplets in equilibrium with vapor.

The shell 1 is mounted on a bell 8 that extends upwards into the shell and defines an annular collecting trough 9 between itself and the shell wall. The trough communicates with a draw-off pipe 10 having a valve 11; it should be understood that this valve may be operated automatically by a suitable liquid level controller (not shown) to maintain a body of liquid within the trough 9. The surface of the liquid will not be level, as described hereinafter. The bell 8 is formed as a surface of revolution and is open at the top to provide an axially and upwardly directed intake opening 12, which is suitably situated some distance below the inlet opening 2 and advantageously has a diameter from about 0.3 D and 0.8 D, D being the internal diameter of the shell at the level of the intake opening 12. The bell defines within itself a downwardly diverging gas- or vapor-downcomer passage 13 that is coaxial with the shell and in free communication therewith. A wall structure such as a cone-like deflector 14 is mounted in spaced relation to the wall 8 and gives an annular shape to the downcomer passage 13. It will be noted that the outer wall of the deflector is curved concavely, as viewed in section, to conform approximately to the curved contour of the wall 8, but may recede from the wall 8 progressively toward the bottom, as also shown, so that the horizontal cross sectional area of the downcomer passageway increases toward the bottom slightly more than proportionally with the radius. The contours of these walls, and particularly that of the wall 8, should for best results be as described in more detail below. The passageway 13 and the entrance thereto at 12 are circumferentially unobstructed to permit free rotational movement of the gas and spacers or supports positioned therein, if any, should be streamlined and inclined so as to offer a minimum of interference to the free whirling of the gas. The deflector 14, when provided, may be mounted on a support structure 15 that is connected to an annular part 16 by radial members 17, and the part 16 is supported by the outer wall structure. The radial members 17 may optionally be straightening vanes curved as shown to reduce or stop the tangential motion of the gas as it emerges from the bottom of the downcomer.

A condenser including a shell 18 is mounted directly beneath the downcomer of the centrifugal separator and in free communication therewith to receive the effluent gas. It is provided with cooled surfaces of any type, e. g., a plurality of vertical tubes 19 extending between upper and lower manifold rings 20 and 21, respectively, through which cooling fluid is passed via the connecting pipes 22 and 23. It should be understood that the tubes indicated are merely suggestive, and that in practice more tubes would be installed, if desired, provided with baffles, to provide an extended cooled area and to insure good contact therewith, as is well understood in the condenser art. Total or partial condensation may be effected in the condenser, depending upon the nature of the gas and temperature and pressure conditions in the condenser.

The condensate and uncondensed vapor, if any, may be discharged from the condenser for example through a bottom opening into a horizontal drum 25 which constitutes a low-pressure zone. When operated as a vacuum system, a reduced pressure is maintained by any suction device, such as a jet eductor 26, which may comprise several stages, supplied by steam at 27 and having the suction side thereof connected to the drum by a vapor riser 28. When the gas passing through the condenser contains an appreciable quantity of valuable uncondensed material, this is discharged from the eductor through the pipe 29, by which it may be passed to a suitable recovery operation. Liquid condensate is withdrawn from the drum 25 through a discharge pipe 30 at a rate controlled by a suitable flow controller, such as a valve 31 operated automatically by a liquid level controller, diagrammatically represented by the float 32 and control line 33, so as to maintain a liquid level in the drum. It is evident that when the apparatus is operated at subatmospheric pressure the discharge pipe 30 can be connected to a discharge pump.

When used, for example to separate liquid from vapor resulting from the flashing of a petroleum fraction, the hot oil from the pipe 6 is expanded to cause vaporization in the transfer duct 5, the conditions being chosen in accordance with the purpose of the separation; thus, the oil in the pipe 6 may be below or above thermal cracking temperature and at subatmospheric, atmospheric, or elevated pressure, and any of a similar range of pressures may prevail in the transfer duct. The dispersion enters the shell 1 tangentially, thereby assuming a whirling movement about the shell axis. In the specific embodiment illustrated, wherein the inlet is at the outer wall, there is a vortex formation with a progressive increase of angular velocity toward the center up to a small cylindrical region near the axis, within which the angular velocity is about constant. The increase in angular velocity outside of this central region tends to be such that angular momentum is constant, but friction and turbulence cause considerable deviations from such a relation; it is usually true, however, that the tangential velocity increases with decreasing radii down to that of the central region. The vapor and dispersed liquid thus move downwards through the separating zone along generally helical paths and the liquid drops are hurled outward by centrifugal force, concentrated at the outer part of the separating zone and collected in the trough 9, which constitutes a collecting zone. The residual vapor, still possessing high angular momentum and, hence, high tangential velocity enters the downcomer passage 13 at the level of the intake opening 12. In flowing through this passage the vapor moves downwardly in divergent directions that are skew with respect to the central vertical axis, in accordance with the shape of the wall 8. The peripheral or tangential velocity of the vapor is reduced by a factor that tends to equal the inverse of the first power of the ratio of the radius at the top of the downcomer passage to that at the bottom; the exact velocity ratios realized in any specific case would, of course, deviate from this for the reasons indicated above. By such a reduction of tangential velocity a large part of the kinetic energy is converted into pressure, whereby pressure recovery is effected and the overall pressure drop through the separator is reduced. The straightening vanes 17, when used, further reduce the tangential velocity and in some instances bring about a small additional pressure recovery.

The preferred shape for the inner surface of the wall 8 is a hyperboloid of revolution of one sheet about the vertical cyclone axis having its asymptotic conical surface such that the tangent of half the cone angle is equal to the ratio of the tangential vapor velocity to the downward vapor velocity, (the term "cone angle" being used herein to denote twice the angle from the cone axis to the cone surface). In practice, other shapes approaching such a hyperboloid of revolution may, of course, be used with excellent results. The wall 8 should meet a further condition: it must extend to a sufficient height above the draw-off pipe 10 to prevent liquid in the trough 9 from spilling over the edge at 12. In this connection it is pointed out that there is a pressure gradient along the outer surface of the wall 8 with the lowest pressure prevailing at the part of smaller radius; hence the liquid level is higher at the wall 8 than at the wall of the column 1 by an amount that increases with increasing tangential vapor velocity and vapor density and decreases with increasing rotation of the liquid in the trough. It is, therefore, important that the height of the wall 8 be made sufficient, having regard to the operating conditions in the cyclone.

As regards the shape of the deflector cone 14, it is preferred to have the top thereof extend to or substantially to the level of the intake opening 12 and to be blunt on top, i. e., to have sufficient thickness already at the top to fill the central part of the intake opening; a slight rounding of the upper tip, as shown, is advantageous, but a sharp point should be avoided. This preferred shape eliminates a central region of low pressure into which vapor would otherwise be drawn upwards from the lower region of the passageway 13, resulting in the formation of vertical eddy currents. Such eddy currents are detrimental to the recovery of pressure and upset the separation within the cyclone.

It is evident that by the above-described technique the vapor is expanded directly into the condenser and pressure recovery is realized in a manner that the beneficial effects thereof are not dissipated by intervening pipes, bends, constructions, etc., that cause undesirable pressure drops particularly in the case of rotating gas. This results in lower pressures in the separating zone between the inlet 2 and trough 9 for given pressures in the condenser 18. Moreover, because the cyclone uses a uni-flow principle, whereby there is no reversal of gas flow within the cyclone, the overall pressure drop is small, resulting in substantially lower pressures in the transfer duct 5 for like pressures in the condenser. These factors lead to the important advantages that selected equilibrium conditions in the transfer line 5 and in the separator 1 can be established with less suction in the condenser and, hence, with lesser expenditure of power for ejecting the uncondensed vapor.

We claim as our invention:

1. A pressure-recovery centrifugal separator comprising: a vortex chamber having an enclosing wall shaped internally as a vertically elongated, continuous surface of revolution about an upright axis, an inlet situated in the upper part of said wall and disposed tangentially thereto for admitting a gas containing dispersed material with a whirling motion about said axis for downward travel along said surface, an internal wall structure within a lower part of the chamber defining an annular collecting trough for separated material and a central gas-downcomer duct extending therethrough, said duct having at the top thereof an axially and upwardly directed intake opening of diameter less than the smallest diameter of said surface of revolution and spaced below said inlet by a vertical distance at least as great as the said diameter of the intake opening and the inner surface of said duct being substantially a surface of revolution about said axis having a gradually increasing divergence toward the bottom for discharging gas directly from the region of the chamber axis downwards while increasing the pressure thereof, said chamber providing a clear flow path over the full cross section thereof above the said duct, and an outlet for discharging collected material from said trough.

2. A separator according to claim 1 which includes centrally within said gas-downcomer duct an axially elongated deflecting body the outer surface of which is substantially a surface of revolution about said axis, has a gradually increasing divergence toward the bottom, and is peripherally spaced from the said inner surface of the duct, said deflecting body defining with said duct an annular, divergent passage which is circumferentially unobstructed for the flow of gas with a tangential flow component.

3. A separator according to claim 2 wherein said deflecting body has a rounded, blunt upper end situated substantially at the level of the said intake opening of the duct and filling the central portion of said opening.

4. A pressure-recovery centrifugal separator comprising: a vortex chamber having an upright axis, an inlet at the upper part of the chamber directed to admit a gas containing dispersed material with a whirling motion about said axis, means for collecting said material within a lower part of said chamber and for discharging collected material from the chamber, and a downwardly extending gas-downcomer duct having at the top thereof an axially and upwardly directed intake opening having a diameter less than that of the chamber, said duct being divergent downwardly from said intake opening and having the inner confining surface thereof shaped substantially as a hyperboloid of revolution of one sheet about the said axis.

5. A pressure-recovery centrifugal separator comprising: a vortex chamber having an enclosing wall shaped internally substantially as a surface of revolution about the chamber axis, an inlet at one end of the chamber directed to admit a gas burdened with dispersed material with a whirling motion about said axis, means for collecting and discharging said material from the chamber, a gas-outlet duct situated at the other end of the chamber, said duct having an inner confining surface which is shaped substantially as a hyperboloid of revolution of one sheet about the said axis and diverges in the flow direction away from the inlet end of the chamber and being open at the end toward said inlet end to provide a central, axially directed intake opening in direct communication with the region of the chamber axis, the part of said chamber adjoining said intake opening providing a clear flow path over the full cross section thereof, and a deflecting body situated within said outlet duct the outer surface of which is substantially a surface of revolution about said axis, has a gradually increasing divergence in the said flow direction from the vicinity of said intake opening, and is peripherally spaced from said confining surface of the duct to define therewith an annular, divergent passage.

6. A separator according to claim 5 wherein said intake opening in the gas-outlet duct has a diameter between about 0.3 and 0.8 times the diameter of the said chamber and the end of said deflecting body toward said inlet end of the chamber is blunt, thereby filling the central portion of said opening.

7. A combined centrifugal separator and condenser for separating liquid droplets from vapor in equilibrium therewith which comprises: a stationary centrifugal separating drum including an enclosing wall and having an upright axis, an inlet disposed substantially tangentially to said enclosing wall at an upper part thereof for the admission of a mixture of said vapor containing said liquid droplets dispersed therein with a vortical motion about said axis, an annular liquid-collecting trough situated within the chamber at a lower part thereof, an axial vapor-downcomer duct extending centrally through said trough and being open at the top at an upwardly directed intake opening, said trough and intake opening being spaced vertically the said inlet by a distance at least as great as the said diameter of the intake opening and said chamber for the concurrent downflow of said vapor and liquid as vortical streams through the chamber and simultaneous segregation of the vapor at the axis followed by direct entry of the vapor into the downcomer duct, a condenser including a chamber which contains condensing surfaces and is mounted beneath and in direct communication with said downcomer duct to receive vapor directly therefrom.

8. A combined centrifugal separator and condenser according to claim 7 wherein said vapor-downcomer duct has an inner surface of revolution about said upright axis having a gradually increasing divergence toward the condenser and is circumferentially unobstructed for discharging vapor into the condenser with a peripheral flow component at progressively increasing radii and with an increase in pressure.

9. In combination with the apparatus according to claim 8, a deflecting body having a downwardly diverging surface of revolution situated centrally within said vapor-downcomer duct and spaced from said inner surface of the duct to define therewith an annular, gradually divergent passage for the vapor.

References Cited in the file of this patent

UNITED STATES PATENTS

| | | |
|---|---|---|
| 424,157 | Woodbury et al. | Mar. 25, 1890 |
| 612,207 | Kincaid et al. | Oct. 11, 1898 |
| 616,431 | Thom | Dec. 20, 1898 |
| 1,522,205 | Petrovsky | Jan. 6, 1925 |
| 2,192,214 | Weir | Mar. 5, 1940 |
| 2,487,633 | Breslove | Nov. 8, 1949 |

FOREIGN PATENTS

| | | |
|---|---|---|
| 620,874 | France | Jan. 25, 1927 |
| 123,934 | Austria | July 25, 1931 |
| 172,637 | Austria | Sept. 25, 1952 |
| 1,033,743 | France | Apr. 8, 1953 |
| 1,034,995 | France | Apr. 15, 1953 |